United States Patent
Kano et al.

(10) Patent No.: US 8,923,526 B2
(45) Date of Patent: Dec. 30, 2014

(54) AUDIO DEVICE

(75) Inventors: Masaya Kano, Hamamatsu (JP);
Toshihito Uchiyama, Hamamatsu (JP);
Kunihiro Kumagai, Hamamatsu (JP);
Kazunobu Fujiwara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 282 days.

(21) Appl. No.: 13/387,329

(22) PCT Filed: Jul. 28, 2010

(86) PCT No.: PCT/JP2010/062703
§ 371 (c)(1),
(2), (4) Date: Jan. 26, 2012

(87) PCT Pub. No.: WO2011/013704
PCT Pub. Date: Feb. 3, 2011

(65) Prior Publication Data
US 2012/0128179 A1 May 24, 2012

(30) Foreign Application Priority Data
Jul. 29, 2009 (JP) ................................ 2009-176842

(51) Int. Cl.
*H04B 3/00* (2006.01)
*H04N 21/81* (2011.01)
*H04N 21/41* (2011.01)
*H04N 21/436* (2011.01)
*H04S 3/00* (2006.01)
*H04N 21/4363* (2011.01)

(52) U.S. Cl.
CPC ....... *H04N 21/8106* (2013.01); *H04N 21/4131* (2013.01); *H04N 21/43615* (2013.01); *H04S 3/008* (2013.01); *H04N 21/43635* (2013.01)
USPC ............................................ 381/77; 381/119

(58) Field of Classification Search
USPC ......... 381/1, 17, 22, 23, 77, 78, 74, 119, 120, 381/123, 300; 700/94; 704/500, 501
See application file for complete search history.

(56) References Cited

U.S. PATENT DOCUMENTS 6,931,291 B1 * 8/2005 Alvarez-Tinoco et al. ...... 700/94
2007/0230909 A1 * 10/2007 Mukaide et al. ................. 386/96
(Continued)

FOREIGN PATENT DOCUMENTS

| JP | 2007-267116 A | 10/2007 |
|---|---|---|
| JP | 2008-78879 A | 4/2008 |
| JP | 2008-301454 A | 12/2008 |
| JP | 2009-44502 A | 2/2009 |

OTHER PUBLICATIONS

Japanese language Office Action with English translation dated Aug. 13, 2013 (8 pages).

(Continued)

*Primary Examiner* — Vivian Chin
*Assistant Examiner* — Friedrich W Fahnert
(74) *Attorney, Agent, or Firm* — Crowell & Moring LLP

(57) ABSTRACT

An audio device (e.g. an AV amplifier), with a plurality of audio output terminals according to the HDMI standard, converts audio data of a source device into audio signals suited to audio reproduction abilities (e.g. channel counts) of sink devices. The audio device stores a plurality of audio reproduction ability information describing the predetermined channel count thereof and the channel counts of sink devices, wherein arbitrary audio reproduction ability information precluding audio reproduction ability information of a sink device with the smallest channel count is provided to a source device. The audio device performs down-mixing on audio signals with respect to a sink device whose channel count is smaller than the predetermined channel count, while the audio device performs signal processing on audio signals with respect to a sink device whose channel count is larger than the predetermined channel count.

4 Claims, 4 Drawing Sheets

(56) References Cited

U.S. PATENT DOCUMENTS

| | | | |
|---|---|---|---|
| 2008/0319764 A1* | 12/2008 | Nagle et al. | 704/500 |
| 2009/0055005 A1* | 2/2009 | Oxman et al. | 700/94 |
| 2009/0060227 A1* | 3/2009 | Kanoh et al. | 381/119 |
| 2010/0296656 A1* | 11/2010 | Oh et al. | 381/17 |

OTHER PUBLICATIONS

International Search Report dated Aug. 31, 2010 including English-language translation (Two (2) pages).

* cited by examiner (a) | EDID | AUDIO REPRODUCTION ABILITY | TV(1) VIDEO REPRODUCTION ABILITY |

(b)
| OUTPUT DEVICE | AUDIO | VIDEO |
|---|---|---|
| AV AMPLIFIER SPEAKER | 1 | — |
| TV(1) | 1 | 1 |
| TV(2) | 0 | 1 |

110

(c)
| OUTPUT DEVICE | EDID | |
|---|---|---|
| TV(1) | AUDIO REPRODUCTION ABILITY (2ch) | VIDEO REPRODUCTION ABILITY |
| TV(2) | AUDIO REPRODUCTION ABILITY (2ch) | VIDEO REPRODUCTION ABILITY |

120

AUDIO DEVICE

TECHNICAL FIELD

The present invention relates to an audio device having a plurality of audio channels, and in particular to an audio device that is able to receive and transmit audio data via an HDMI (High-Definition Multimedia Interface) between a source device and a sink device.

The present invention claims priority on Japanese Patent Application No. 2009-176842 (filing date: Jul. 29, 2009), the entire content of which is incorporated herein by reference.

BACKGROUND ART

FIG. 6 shows the conventional constitution of an audiovisual system (AV system). In this AV system, a source device 50 such as a DVD player is connected to an AV amplifier 60 via an HDMI cable 71. The AV amplifier 60 is connected to a television receiver (TV) 80 via an HDMI cable 72. The AV amplifier 60 is connected to speakers 90 via an analog audio output cable 73.

When a source device (i.e. a transmitter device) is connected to a sink device (i.e. a receiver device) such as the AV amplifier 60 and the TV 80, these devices mutually exchange their device information, including reproduction ability information of the sink device, called EDID (Extended Display Identification Data) therebetween upon establishment of a connection, so that an authentification is implemented between the source device and the sink device. When the source device 50 transmits audio data to sink devices, transmission of audio data is carried out in connection with a sink device with the lowest audio reproduction ability. In the conventional AV system shown in FIG. 6, the source device 50 transmits audio data to the AV amplifier 60 in accordance with an audio reproduction ability of the TV 80 having a smaller number of audio channels among two sink devices (i.e. the AV amplifier 60 and the TV 80). When the TV 80 has a 2ch audio reproduction ability irrespective of a 5.1ch audio reproduction ability of the AV amplifier 60, the source device 50 carries out down-mixing on audio data, given by a 5.1 ch audio source, so as to transmit 2ch-compatible audio data to the AV amplifier 60.

Patent Document 1 provides a solution to this problem with reference to the AV system shown in FIG. 6, wherein EDID representing an audio reproduction ability of the AV amplifier 60 is sent to the source device 50 when the TV 80 does not provide an audio output, whilst EDID representing an audio reproduction ability of the TV 80 is sent to the source device 50 when the TV 80 provides an audio output. Thus, the AV amplifier 60 and the TV 80 are able to receive audio data from the source device 50 in response to the numbers of audio channels.

PRIOR ART DOCUMENT

Patent Document

Patent Document 1: Japanese Patent Application Publication No. 2008-301454

SUMMARY OF THE INVENTION

Problem to be Solved by the Invention

The technology of Patent Document 1 effectively works in an environment in which the AV system shown in FIG. 6 provides an audio output via either a TV 80 or speakers 90, wherein the source device 50 is able to selectively allocate audio data in response to audio reproduction abilities. However, when the TV 80 and the speakers 90 are located in different rooms although the same audio data is reproduced by the TV 80 and the speakers 90, the source device 50 transmits audio data in conformity with the number of audio reproduction channels installed in the TV 80, so that audio data should be transmitted using a few channels, the number of which is less than the number of audio reproduction channels installed in an AV amplifier 60. That is, it is not possible to make full use of an audio reproduction ability of the AV amplifier 60. For this reason, it is expected to develop an audio device that is able to provide its audio output in conformity with the AV amplifier 60 and the TV 80 with different audio reproduction abilities.

Means for Solving the Problem

It is an object of the present invention to provide an audio device that is able to transmit audio data, given by a source device, in conformity with a plurality of sink devices with different audio reproduction abilities.

An audio device according to the present invention, having a plurality of audio output terminals, produces audio signals suited to audio output-targeted devices connected to the audio output terminals.

This audio device includes a memory that stores a plurality of audio reproduction ability information describing at least a predetermined first channel count and second channel counts of audio output-targeted devices; an input part that provides a source device with the audio reproduction ability information precluding the audio reproduction ability information of an audio output-targeted device with the smallest channel count among the plurality of audio reproduction ability information; and a signal processor in which, when audio signals corresponding to the channel count indicated by the audio reproduction ability information are read from the source device, audio signals of the source device are subjected to down-mixing, suited to the channel count indicated by the audio reproduction ability information of the audio output-targeted device, and then supplied to the audio output-targeted device whose channel count is smaller than the channel count of audio signals of the source device, whilst audio signals of the source device are subjected to signal processing, suited to the channel count indicated by the audio reproduction ability information of the audio output-targeted device, and then supplied to the audio output-targeted device whose channel count is larger than the channel count of audio signals of the source device.

A plurality of output terminals is connected to a first audio output-targeted device receiving audio signals of the first channel count and a second audio output-targeted device receiving audio signals of the second channel count, wherein the input part receives and stores the audio reproduction ability information of the second audio output-targeted device in the memory, thus providing the source device with the audio reproduction ability information, indicating a maximum channel count, among a plurality of audio reproduction ability information.

Additionally, the signal processor may perform dynamic range compression in response to a volume of audio signals subjected to down-mixing, thus controlling a volume for reproducing audio signals. Moreover, the signal processor may perform down-mixing to produce audio signals after performing a convolution process using a head-related transfer function in response to the predetermined first channel count.

Effect of the Invention

When a source device is connected to a plurality of audio output-targeted devices with different audio reproduction abilities, the present invention is able to prevent audio signals from being provided in conformity with the lowest audio reproduction ability, whereby it is possible to provide audio signals suited to the audio reproduction ability of each audio output-targeted device.

Among a plurality of audio reproduction ability information, the audio reproduction ability information indicating the maximum channel count is provided to a source device; hence, it is possible to achieve an audio output with an appropriate sound quality without degrading the audio reproduction ability of each audio output-targeted device.

Moreover, audio signals subjected to down-mixing are further subjected to dynamic range compression in response to their volume; hence, it is possible to achieve audio reproduction with an appropriate volume. Alternatively, it is possible to perform down-mixing on audio signals after performing a convolution process using a head-related transfer function in response to the predetermined channel count.

Thus, it is possible to provide audio signals, involving a virtual surround effect, to an audio output-targeted device with low audio reproduction ability.

MODE FOR CARRYING OUT THE INVENTION

1. System Configuration

Figure 1:
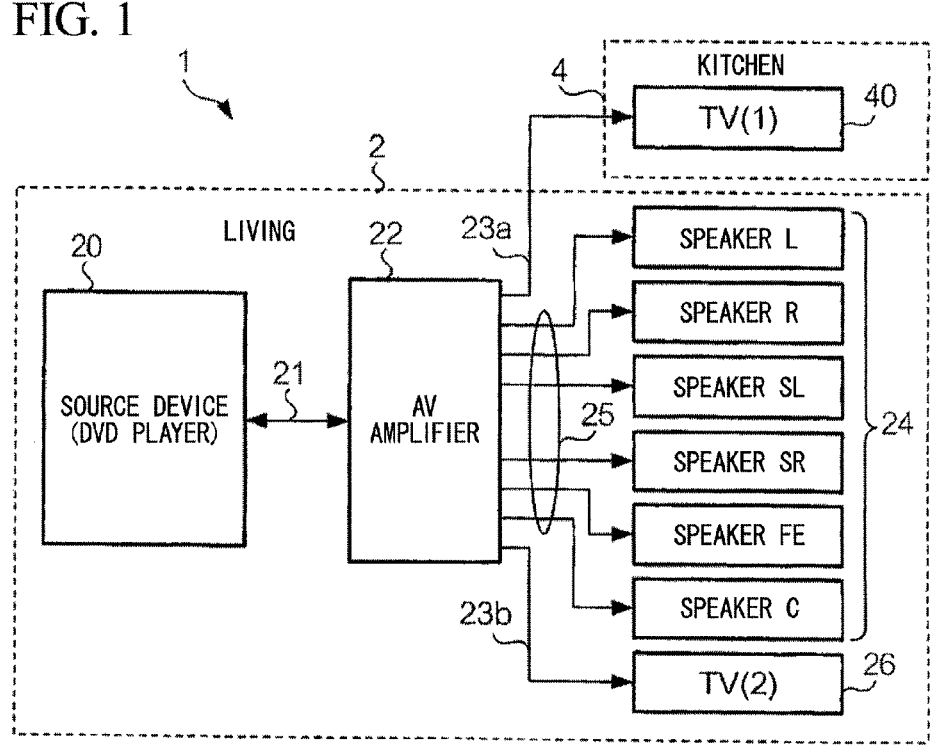
FIG. 1 A block diagram showing the constitution of an AV system according to an embodiment of the present invention.

FIG. 1 is a block diagram showing the constitution of an AV system 1 according to an embodiment of the present invention, wherein a dashed-line block 2 indicates a living room, and a dashed-line block 4 indicates a kitchen. A source device 20 such as a DVD player and an AV amplifier 22, corresponding to the present invention, are located in the living room 2, wherein they are connected together via an HDMI terminal (not shown) and an HDMI cable 21. The source device 20 installs recording media (e.g. DVD) storing video and audio data, wherein the source device 20 reads content data, specified by a user, from recording media and transmits it to the AV amplifier 22 via the HDMI cable 21.

The AV amplifier 22 has two HDMI terminals for outputting content data provided by the source device 20, wherein one HDMI terminal is connected to an HDMI cable 23a, which is wired in the kitchen 4, and thus connected to a television receiver (TV(1)) 40. The other HDMI terminal of the AV amplifier 22 is connected to an HDMI cable 23b, which is wired in the living room 2, and thus connected to another television receiver (TV(2)) 26. Additionally, the AV amplifier 22 has 5.1ch speaker audio terminals which are connected to analog audio cables 25, wired in the living room 2, and thus connected to 5.1ch speakers 24.

The AV amplifier 22 includes two series of HDMI terminals, connected to the HDMI cables 23a, 23b, and one series of analog audio output terminals, connected to the analog audio cables 25; but this is not a restriction. For instance, the AV amplifier 22 may have one HDMI terminal or three or more HDMI terminals, whilst the AV amplifier 22 may have two or more series of analog audio output terminals. The AV amplifier 22 of the present embodiment has 5.1ch speaker audio output terminals as analog audio output terminals; alternatively, the AV amplifier 22 may have 7.1ch speaker audio output terminals.

The present embodiment is applied to an environment in which the TV(2) 26 and speakers 24 are arranged in the living room 2 whilst the TV(1) 40 is arranged in the kitchen 4. When users prefer to simultaneously listen to the same content in both the living room 2 and the kitchen 4, the speakers 24 reproduce 5.1ch audio content while the TV(2) 26 reproduces video content in the living room 2. In the kitchen 4, the TV(1) 40 reproduces video content whilst 2ch speakers (i.e. an L (Left) channel and a R (Right) channel) incorporated in the TV(1) 40 reproduce audio content.

2. Constitution of AV Amplifier

Figure 2:
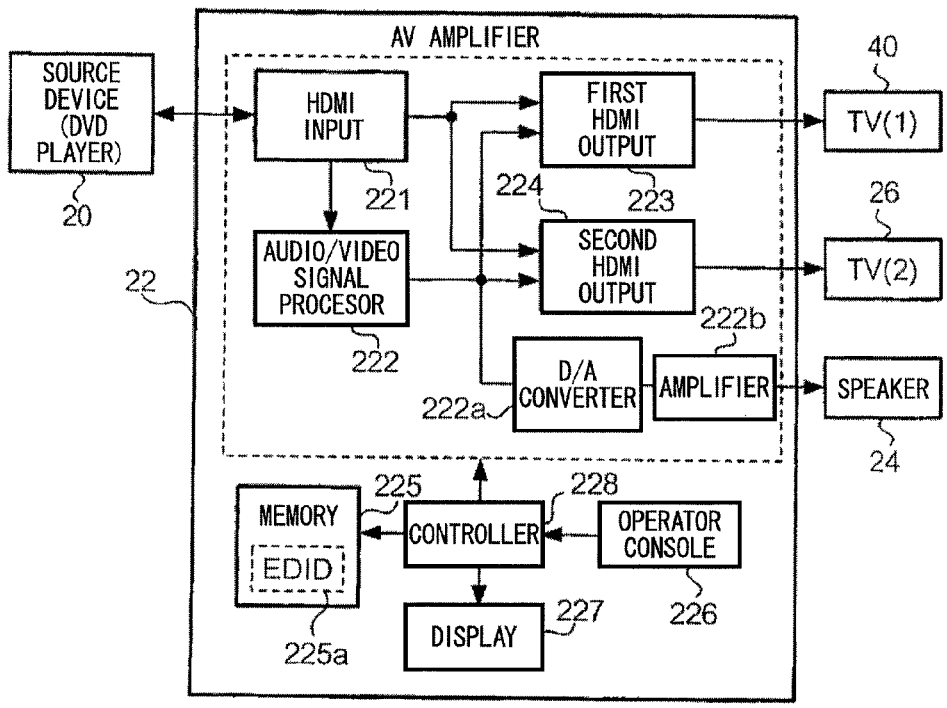
FIG. 2 A block diagram showing the constitution of an AV amplifier shown in FIG. 1.

Next, the constitution of the AV amplifier 22 of the present invention will be described. FIG. 2 is a block diagram showing the constitution of the AV amplifier 22. The AV amplifier 22 includes an HDMI input part 221, an audio/video signal processor 222, a D/A converter 222a, an amplifier 222b, a first HDMI output part 223, a second HDMI output part 224, a memory 225, an operator console 226, a display 227, and a controller 228.

The HDMI input part 221 has an HDMI terminal, which is connected to the source device 20 via the HDMI cable 21. The HDMI input part 221 receives digital content data, representing video and audio data, from the source device 20. When the HDMI input part 221 is connected to the source device 20, it provides EDID, including reproduction ability information representing audio output (hereinafter, referred to as "audio reproduction ability information") and reproduction ability information representing video output (hereinafter, referred to as "video reproduction ability information"), to the source device 20 under control of the controller 228. Additionally, the HDMI input part 221 extracts video signals and audio signals from digital content data, provided by the source device 20, so as to output them to the audio/video signal processor 222. In this connection, the audio reproduction ability information includes at least audio output channel counts whilst the video reproduction ability information includes resolutions and types of video signals.

The audio/video signal processor 222 is configured of an audio processing DSP (Digital Signal Processor), which delivers video signals, input to the HDMI input part 221, to the first HDMI output part 223 and the second HDMI output part 224. Herein, a user selects at least one of the speakers 24, the TV(1) 40, and the TV(2) 26 as an audio output-targeted device, thus specifying its channel count. For this reason, the audio/video signal processor 222 generates audio/video signals in conformity with the channel count of the audio output-targeted device. The present invention includes the audio/video signal processor 222, which is configured of the audio processing DSP, wherein the audio/video signal processor 222 can be configured of an analog down-mixing circuit instead of the audio processing DSP.

The audio/video signal processor 222 generates audio signals in accordance with the following procedures. First, the audio/video signal processor 222 performs decoding according to the coded form of digital audio signals input by the HDMI input part 221. When the channel count of digital audio signals input by the HDMI input part 221 is larger than the reproducible channel count of an audio output-targeted device, the audio/video signal processor 222 performs down-mixing on decoded digital audio signals by use of down-mixing coefficients, which are stored in the AV amplifier 22 in advance, in conformity with the channel count of the audio output-targeted device. The present embodiment is designed such that down-mixing coefficients for use in down-mixing from multichannel to 2ch are stored in the memory 225 in advance; alternatively, content data, given by the source device 20, may include down-mixing coefficients for use in down-mixing from multichannel to 2ch.

To provide audio signals to the TV(1) 40, the audio/video signal processor 222 converts audio signals input thereto into a form reproducible by the TV(1) 40 while performing down-mixing to the reproducible channel count of the TV(1) 40, so that the resultant audio signals are forwarded to the first HDMI output part 223. The present embodiment provides audio output to the speakers 24 but does not provide audio output to the TV(2) 26; hence, no audio output is provided for the second HDMI output part 224.

The D/A converter 222a performs D/A conversion on digital audio signals, decoded by the audio/video signal processor 222, which are thus converted into analog audio signals and supplied to the amplifier 222b. The amplifier 222b performs the predetermined amplification process on analog audio signals, supplied by the D/A converter 222a, which are then forwarded to the speakers 24.

The first HDMI output part 223 has an HDMI terminal, which is connected to the TV(1) 40 via the HDMI cable 23a. The second HDMI output part 224 has an HDMI terminal, which is connected to the TV(2) 26 via the HDMI cable 23b. When the first HDMI output part 223 is connected to the TV(1) 40 via the HDMI cable 23a, or when the second HDMI output part 224 is connected to the TV(2) 26 via the HDMI cable 23b, the first HDMI output part 223 or the second HDMI output part 224 retrieves EDID from the TV(1) 40 or the TV(2) 26 by way of a plug-and-play function according to DDC (Display Data Channel).

A user is supposed to designate a video output-targeted device (i.e. the TV(1) 40 or the TV(2) 26) and an audio output-targeted device (i.e. TV(1) 40 or the speakers 24). Herein, the first HDMI output part 223 and the second HDMI output part 224 provide video signals, derived from digital content data processed by the audio/video signal processor 222, to the video output-targeted device. Additionally, the first HDMI output part 223 provides audio signals, derived from digital content data, to the audio output-targeted device (i.e. the TV(1) 40). In this connection, user setting information for specifying the video output-targeted device and the audio output-targeted device is stored in the memory 225.

The memory 225 is configured of nonvolatile storage media or volatile storage media, wherein a predetermined storage area (hereinafter, referred to as an "EDID storage area") 225a stores reproduction ability information which is provided to the source device 20. In the present embodiment, as shown in FIG. 3(a), EDID including the audio reproduction ability information (i.e. the maximum channel count, 5.1ch) of the AV amplifier 22 and the video reproduction ability information of the TV(1) 40 is stored in the EDID storage area 225a. The audio reproduction ability information representing the maximum channel count of the AV amplifier 22 is fixed among various pieces of reproduction ability information stored in the EDID storage area 225a. On the other hand, the video reproduction ability information stored in the EDID storage area 225a is rewritten into the video reproduction ability information of a low-resolution device (e.g. TV), for example, in conformity with EIDI of a video output-targeted device connected to an audio device.

An area other than the EDID storage area 225a in the memory 225 stores user setting information 110, as shown in FIG. 3(b), indicating whether or not a device (e.g. a speaker, a TV) connected to the AV amplifier 22 is an audio/video output-targeted device. This user setting information 110 is set by a user. The user setting information 110 shown in FIG. 3(b) includes flags "1", indicating that the TV(1) 40 and the speakers 24 are regarded as audio output-targeted devices, and flags "1", indicating that the TV(1) 40 and the TV(2) 26 are regarded as video output-targeted devices. When a plurality of devices is not involved in simultaneous audio/video output operations, it is possible to set audio/video output to any one device among the TV(1) 40, the speakers 24, and the TV(2) 26.

Another area of the memory 225 stores device information 120, as shown in FIG. 3(c), including EDID of video output-targeted devices (i.e. the TV(1) 40, the TV(2) 26) which are connected to the AV amplifier 22 via the HDMI cables 23a, 23b. This device information 120 is correlated to the audio/video reproduction ability information included in EDID of the TV(1) 40 and the TV(2) 26. When reproducing content data input from the source device 20, the audio/video signal processor 222 refers to the device information 120 so as to generate audio signals in conformity with the audio reproduction ability information.

In FIG. 2, the operator console 226 includes various types of operation switches, wherein when a user operates an operation switch, its operation information is forwarded to the controller 228. Additionally, the operator console 226 implements an infrared communication function to receive commands, which are determined in advance upon a user's operation on operation switches, from an external remote control device (not shown), thus forwarding commands to the controller 228. The display 227, including a display screen such as an LED panel and a liquid crystal panel, displays predetermined images under control of the controller 228.

The controller 228 is constituted of a CPU and memories (ROM, RAM), wherein the controller 228 controls various parts of the AV amplifier 22 by executing a control program stored in the ROM by use of a working area of the RAM. Based on the user setting information 110, input audio signals are processed and forwarded to audio output-targeted devices in conformity with the channel counts of audio output-targeted devices connected to the AV amplifier 22 and the channel count of digital audio signals input from the source device 20. Additionally, the channel count of input audio signals is subjected to down-mixing to the channel counts of audio output-targeted devices, thus providing resultant audio signals. In this connection, the memory 225 and the EDID storage area 225a can be arranged in an internal memory of a CPU.

3. Constitution of Source Device

The source device 20 is configured of a player/recorder handling storage media such as DVD and BD (Blu-Ray Disk), a set-top box, or the like, which is connected to the AV amplifier 22 via the HDMI cable 21. Upon a user's operation, the source device 20 reads audio/video content data from storage media so as to forward them to the AV amplifier 22. Additionally, the source device 20 provides content data to the AV amplifier 22 in conformity with the audio/video reproduction ability information indicated by EDID given by the AV amplifier 22. Content data may contain audio data fitted to a plurality of different coded forms such as DTS (Digital Theater System) (a registered trademark), Dolby AC3 (a registered trademark), and 2ch linear PCM. When the AV amplifier 22 stores EDID with 2ch audio reproduction ability information, for example, the source device 20 sends 2ch linear PCM-compatible digital audio signals to the AV amplifier 22. When the AV amplifier 22 stores EDID with 5.1 ch audio reproduction ability information, the source device 20 sends 5.1 ch-compatible digital audio signals to the AV amplifier 22.

To send content data, read from storage media, to the AV amplifier 22, the source device 20 packetizes video data, audio data, and control information of content data in accordance with the HDMI standard while streaming packetized content data, thus providing them to the AV amplifier 22. Each packet stores control information, representing the coded form of audio data, as well as video data and audio data. The present embodiment is designed such that the source device 20 provides audio data in a format corresponding to the HDMI standard; but this is not a restriction. It is possible to provide the AV amplifier 22 with audio data in a format corresponding to the Analog Audio standard or the SPDIF standard, for example, so that the AV amplifier 22 can subsequently provide audio data to an audio output-targeted device connected to its HDMI terminal.

4. Operation of AV amplifier and Content Reproduction Process

Next, a content reproduction process of the AV system 1 will be described in conjunction with the operation of the AV amplifier 22.

Figures 3, 4:
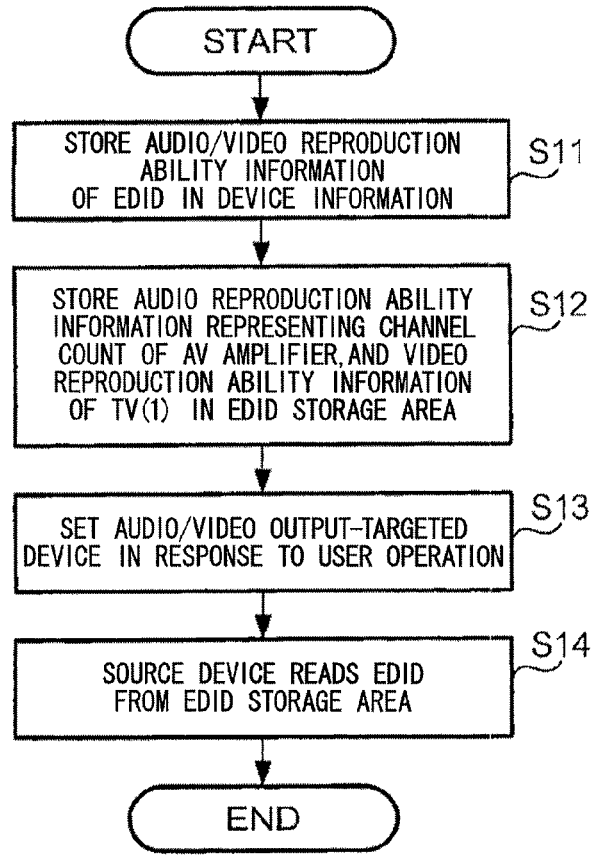
FIG. 3 (a) shows EDID stored in a storage unit of the AV amplifier of the present embodiment; (b) shows user setting information which users set to the AV amplifier; and (c) shows device information of audio/video output-targeted devices.
FIG. 4 A flowchart showing preprocessing that is implemented when the AV amplifier is connected to a source device and an audio/video output-targeted device.

First, preprocessing, which is executed prior to the content reproduction process, will be described with reference to FIG. 4. When the TV(1) 40 and the TV(2) 26 are connected to the AV amplifier 22 via the HDMI cables 23a, 23b, the controller 228 retrieves their EDIDs via the first HDMI output part 223 and the second HDMI output part 224, so that the audio reproduction ability information and video reproduction ability information included in those EDIDs are put together into the device information 120, which is stored in a predetermined area of the memory 225 (step S11). The controller 228 loads the audio reproduction ability information representing the 5.1 ch channel count of the AV amplifier 22 and the video reproduction ability information of the TV(1) 40 into the EDID storage area 225a of the memory 225 (step S12).

A user operates the operator console 226 so as to set audio output to the TV(1) 40 and the speakers 24 while setting video output to the TV(1) 40 and the TV(2) 26. This establishes the user setting information 110. The controller 228 stores the user setting information 110 in a predetermined area of the memory 225 (step S13).

When the source device 20 is connected to the AV amplifier 22, the audio/video reproduction ability information of EDID stored in the EDID storage area 225a of the memory 225 is read and provided to the source device 20 via the HDMI input part 221. Thus, the source device 20 is able to retrieve the audio/video reproduction ability information of EDID stored in the AV amplifier 22 (step S14).

Figure 5:
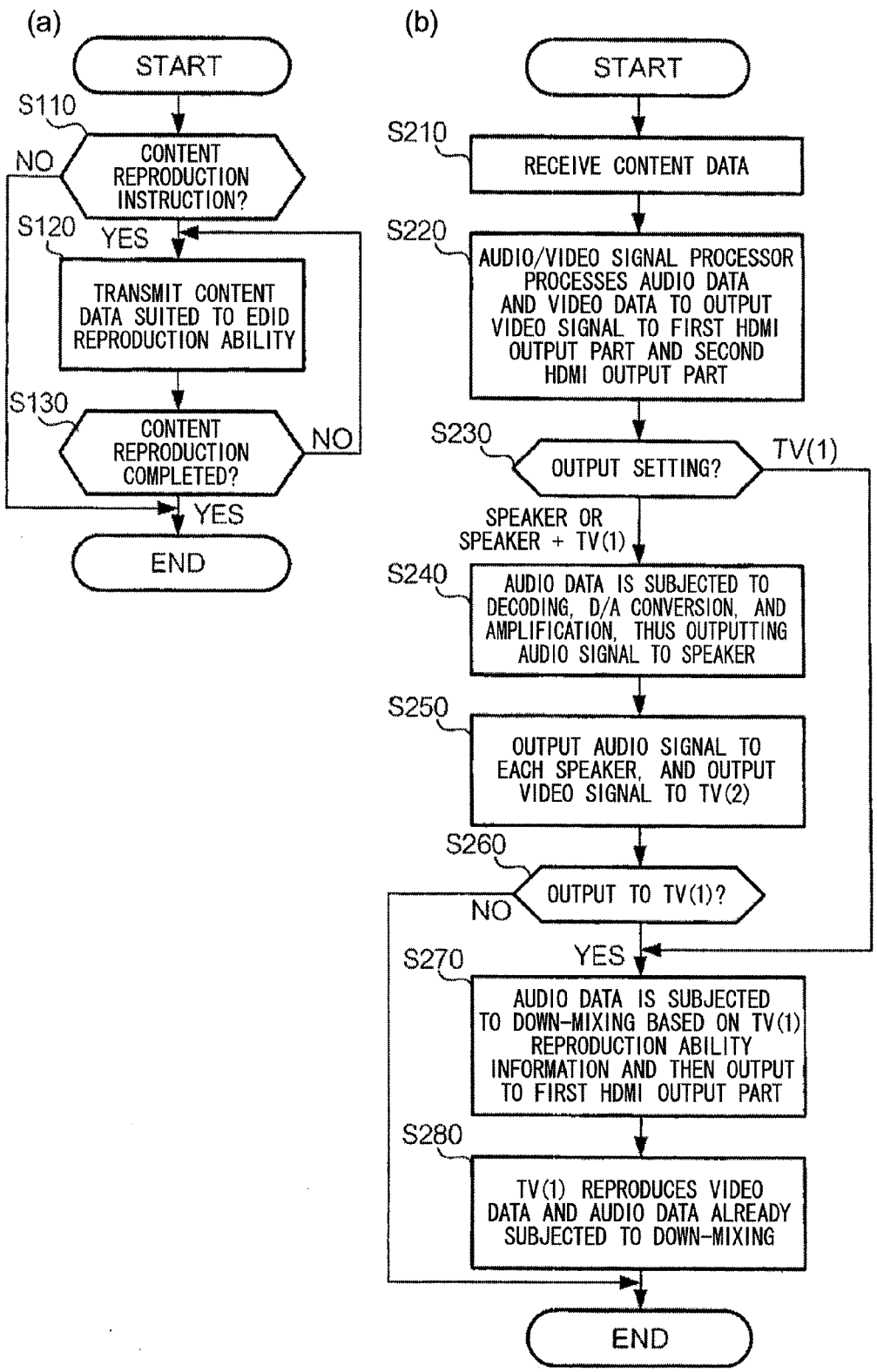
FIG. 5 (a) shows a flowchart of a main routine in a content reproduction process; and (b) shows a flowchart of a detailed routine in the content reproduction process.
Figure 6:
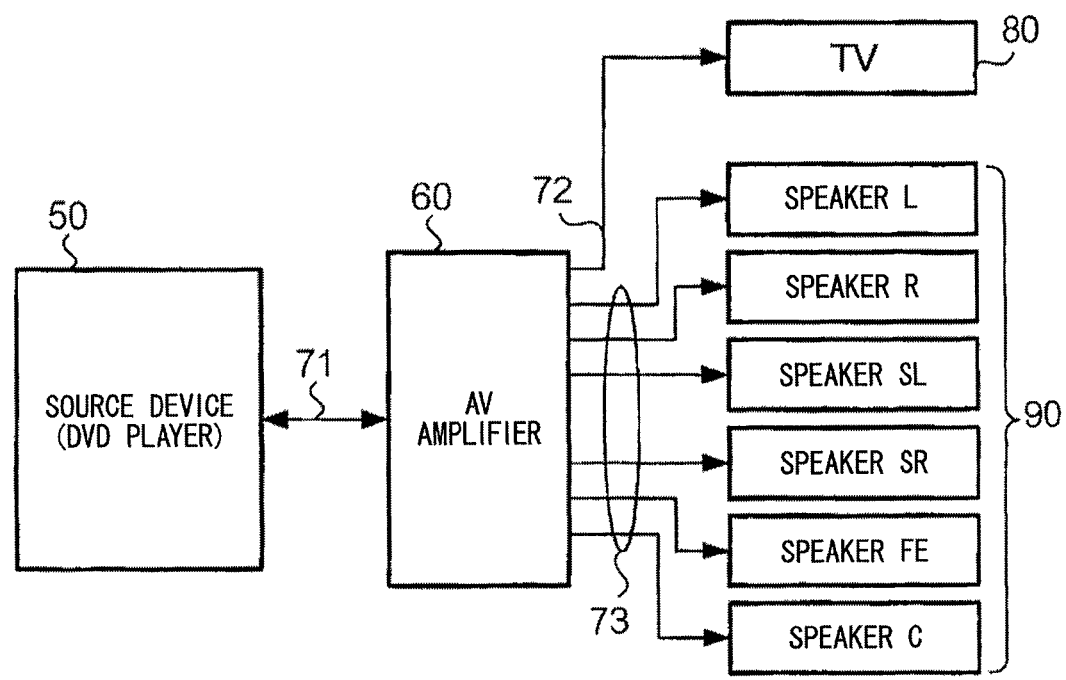
FIG. 6 A block diagram showing the constitution of the conventional AV system.

After completion of the preprocessing, the AV amplifier 22 executes the content reproduction process shown in FIG. 5.

The content reproduction process of the present embodiment includes a main routine shown in FIG. 5(a) and a detailed routine shown in FIG. 5(b). Upon receiving a content reproduction instruction owing to a user's operation (i.e. "YES" in step S110), the source device 20 reads content data, suited to the audio/video reproduction ability information, from storage media based on EDID provided by the AV amplifier 22 involved in the preprocessing, wherein the source device 20 packetizes and streams content data so as to transmit it to the AV amplifier 22 via the HDMI cable 21 (step S120).

The controller 228 of the AV amplifier 22 receives packets, corresponding to content data subjected to streaming transmission, from the source device 20 via the HDMI input part 221 (step S210), wherein the HDMI input part 221 extracts audio data, video data, and control information from packets of content data so as to send them to the audio/video signal processor 222. The audio/video signal processor 222 inputs and processes video data from the HDMI input part 221 so as to provide video signals to the first HDMI output part 223 and the second HDMI output part 224 (step S220).

The controller 228 reads the user setting information 110 from a predetermined area of the memory 225, whereby the audio/video signal processor 222 performs signal processing, corresponding to an audio output-targeted device whose audio output is set to "1", on audio data from the HDMI input part 221 (step S230).

In the present embodiment, the user setting information 110 specifies the TV(1) 40 and the speakers 24 as audio output-targeted devices, so that step S230 branches into two options, i.e. "TV(1)" and "Speaker or Speaker+TV(1)". In step S220, audio data from the HDMI input part 221 corresponds to 5.1ch installed in the AV amplifier 22.

The audio/video signal processor 222 decodes audio data based on control information, extracted from packets input by the HDMI input part 221, thus providing decoded audio data to the D/A converter 222a. The D/A converter 222a performs D/A conversion on decoded audio data so as to provide analog audio signals to the amplifier 222b. The amplifier 222b amplifies analog audio signals so as to provide 5.1ch audio signals to the speakers 24 (step S240). The second HDMI output part 224 refers to the user setting information 110, which is stored in the predetermined area of the memory 225, so as to confirm that "0 (no audio output)" is set to the TV(2) 26, which is thus identified as a video output-targeted device alone. For this reason, the second HDMI output part 224 provides only the video signals, output from the audio/video signal processor 222, to the TV(2) 26 (step S250).

Additionally, the audio/video signal processor 222 confirms that the TV(1) 40 is registered as an audio output-targeted device (i.e. "YES" as a decision result of step S260 according to the user setting information 110 whilst it also confirms the audio reproduction ability information (i.e. 2ch) of the TV(1) 40 according to the device information 120, thus reading a down-mixing coefficient, used for down-mixing, from the memory 225. Thus, the audio/video signal processor 222 performs down-mixing on 5.1 ch audio data, input by the HDMI input part 221, to produce 2ch (i.e. L, R channels) audio data, wherein 2ch audio data is further converted into audio signals in the coded form reproducible by the TV(1) 40, so that audio signals are supplied to the first HDMI output part 223 (step S270). The first HDMI output part 223 sends audio signals and video signals, provided by the audio/video signal processor 222, to the TV(1) 40, which thus reproduces the corresponding audio and video (step S280).

As described above, the present embodiment is designed to fixedly store the audio reproduction ability information of the AV amplifier 22 in the EDID storage area 225a irrespective of the type of audio output-targeted device connected to the AV amplifier 22. This enables the source device 20 to normally provide audio data in conformity with the audio reproduction ability information of the AV amplifier 22. That is, the speakers 24 located in the living room 2 are allowed to reproduce 5.1 ch audio signals whilst the TV(2) 26 located in the kitchen 4 performs down-mixing, using the audio processing function of the AV amplifier 22, on 5.1ch audio signals so as to produce 2ch audio signals; this makes it possible to reproduce an audio part of content data without degrading the audio reproduction ability of the AV amplifier 22.

When the user setting information 110 indicates only the speakers 24 connected to the AV amplifier 22 as an audio output-targeted device, the flow proceeds to step S240 corresponding to an option of "Speaker or Speaker+TV(1)" in step S230; then, the decision result of step S260 turns to "NO", thus exiting the reproduction process. As a result of steps S240 and S250, 5.1 ch audio signals, produced by the audio/video signal processor 222, are forwarded to the speakers 24 whilst video signals are forwarded to the TV(2) 26.

When the user setting information 110 indicates only the TV(1) 40 connected to the AV amplifier 22 as an audio/video output-targeted device, the flow proceeds to steps S270 and S280 in correspondence with an option of "TV(1) 40" in step S230. Herein, the audio/video signal processor 222 performs down-mixing on 5.1ch audio data to provide 2ch audio signals to the TV(1) 40. Thus, the TV(1) 40 is able to reproduce 2ch audio and video.

When the source device 20 reads all the content data from storage media and completely transmits them to the AV amplifier 22, the decision result of step S130 of FIG. 5(*a*) turns to "YES", thus exiting streaming transmission of content data to the AV amplifier 22. If the source device 20 does not receive a content reproduction instruction, the decision result of step S110 turns to "NO", thus exiting the reproduction process without carrying out streaming transmission of content data.

3. Variations (1) The present embodiment is designed such that EDID including the channel count of the AV amplifier 22 is supplied to the source device 20 as the audio reproduction ability information; but this is not a restriction. Among various pieces of audio reproduction ability information of audio output-targeted devices connected to the AV amplifier 22, for example, arbitrary audio reproduction ability information precluding audio reproduction ability information indicating the smallest channel count can be supplied to the source device 20. That is, the AV amplifier 22 receives audio data from the source device 20 in conformity with arbitrary audio reproduction ability information, thus producing audio signals suited to an audio reproduction ability of each audio output-targeted device.

When 7.1ch speakers 24 are connected to the AV amplifier 22 whilst channel counts of other audio output-targeted devices connected to HDMI terminals are 5.1 ch, 3.1 ch, and 2ch respectively, the HDMI input part 221 supplies arbitrary audio reproduction ability information, indicating any one of channel counts (i.e. any one of 3.1ch, 5.1ch, and 7.1ch) precluding 2ch indicating the lowest audio reproduction ability, to the source device 20. In this case, when the source device 20 provides audio data to an audio output-targeted device whose audio reproduction ability is lower than arbitrary audio reproduction ability information, audio data is subjected to down-mixing to match with the channel count reproducible by the audio output-targeted device. In contrast, when the source device 20 provides audio data to an audio output-targeted device whose audio reproduction ability is higher than arbitrary audio reproduction ability information, the audio/video signal processor 222 installs in advance matrix processors implementing a pro-logic for producing 5.1 ch audio data from 2.1ch audio data, NEO:6 (a registered trademark) for producing 6.1ch audio data from 2ch audio data, and Dolby Pro-logic 2x (a registered trademark) for producing 7.1 ch audio data. The audio/video signal processor 222 performs matrix processing on 2ch (L, R channels) audio data provided by the source device 20, thus producing audio signals in correspondence with the channel counts of audio output-targeted devices.

(2) The present embodiment is designed such that audio output-targeted devices whose channel counts are smaller than the channel count connectible to analog audio terminals of the AV amplifier 22 are connected to HDMI terminals, whereas audio output-targeted devices with audio reproduction ability information whose channel count is larger than the channel count of the AV amplifier 22 can be connected to HDMI terminals. In this case, multichannel audio reproduction ability information should be provided to the source device 20. When the channel count of the AV amplifier 22 is 5.1 ch whilst the channel count of an audio output-targeted device connected to an HDMI terminal is 7.1 ch, for example, the controller 228 provides 7.1ch audio reproduction ability information to the source device 20, and then the controller 228 receives 7.1ch audio data from the source device 20. That is, the audio/video signal processor 222 receives 7.1 ch audio data from the source device 20 via the HDMI input part 221 and then performs down-mixing to produce 5.1 ch audio data, wherein 5.1 ch audio data are supplied to the speakers 24 connected to the AV amplifier 22 whilst 7.1ch audio data are decoded and then supplied to the audio output-targeted device.

(3) The present embodiment is designed such that 5.1 ch audio data input from the source device 20 is subjected to down-mixing to 2ch audio data in conformity with the audio reproduction ability information of the TV(1) 40 so as to send audio signals to the TV(1) 40; but this is not a restriction. For instance, it is possible to arrange a dynamic range compression part in the audio/video signal processor 222 so that a dynamic range compression process is carried out in response to a maximum volume level and a minimum volume level of audio data of each channel subjected to down-mixing, thus controlling the volume level.

Alternatively, the audio/video signal processor 222 may carry out a dynamic range compression process and frequency characteristic correction on audio signals, which will be supplied to the first HDMI output part 223 or the second HDMI output part 224.

(4) The present embodiment is designed such that the AV amplifier 22 performs down-mixing on 5.1 ch audio data input from the source device 20 in conformity with the audio reproduction ability (2ch) of the TV(1) 40, thus providing audio signals to the TV(1) 40; but this is not a restriction. For instance, it is possible to perform down-mixing to produce audio signals after performing a convolution process using an HRTF (Head-Related Transfer Function) suited to the predetermined channel count in order to achieve a virtual surround effect. This makes it possible to demonstrate an effect of providing an audio output via 5.1ch virtual speakers by use of 2ch down-mixing audio signals.

(5) Although the present embodiment is designed to connect the TV(2) 26 with an audio/video output ability to the second HDMI output part 224, it is possible to connect a display device, such as a display or a projector without an audio output function, to the second HDMI output part 224.

(6) Although the present embodiment is designed such that audio signals indicating the same content are simultaneously supplied to the TV(1) 40 and the speakers 24, it is possible to supply audio/video signals of content data to the TV(1) 40 alone. In this case, the audio reproduction ability information of the AV amplifier 22 is stored in the EDID storage area 225a; thereafter, the AV amplifier 22 provides EDID to the source device 20 so as to receive audio data from the source device 20 in conformity with the audio reproduction ability information. To supply content data to the TV(1) 40 alone, the audio reproduction ability information of the AV amplifier 22, stored in the EDID storage area 225a of the memory 225, is written with the audio reproduction ability information of the TV(1) 40, so that the AV amplifier 22 provides the audio reproduction ability information of the TV(1) 40 so as to receive audio data from the source device 20 in conformity with the audio reproduction ability information.

(7) The present embodiment is designed such that the source device 20 is connected to the AV amplifier 22 via the HDMI cable 21; but this is not a restriction. For instance, it is possible to connect the source device 20 and the AV amplifier 22 by use of a connection means such as an audio cable and an optical cable. In this case, the audio/video signal processor 222 performs signal processing and A/D conversion so that signals of an audio cable or an optical cable can be supplied to an audio output-targeted device connected to a HDMI terminal of the AV amplifier 22. Herein, the channel count of audio data input to the AV amplifier 22 from the source device 20 is compared to the channel count of an audio output-targeted device connected to the AV amplifier 22, wherein input audio data are subjected to down-mixing, suited to the channel count of the audio output-targeted device, to produce audio signals when the channel count of the audio output-targeted device is smaller than the channel count of input audio data.

(8) Although the present embodiment is designed such that the AV amplifier 22 receives EDID including the audio reproduction ability information from audio/video output-targeted devices such as the TV(1) 40 and the TV(2) 26 via the HDMI cables 23a, 23b, it is possible to store in advance the audio reproduction ability information of audio/video output-targeted devices connected to HDMI terminals in the memory 225 upon a user's operation.

Lastly, the present invention is not necessarily limited to the present embodiment and its variations; hence, the present embodiment may embrace various types of audio devices that fall within the scope of the invention as defined in the appended claims.

INDUSTRIAL APPLICABILITY

The present invention provides an audio device that performs optimum signal processing in response to an audio reproduction ability of each sink device when audio signals are transmitted from a source device having a high-quality audio content reproduction function to a plurality of sink devices having different audio channel counts; hence, the present invention is applicable to the multimedia audio reproduction environment allowing a plurality of digital/analog devices to adaptively reproduce audio contents.

DESCRIPTION OF THE REFERENCE NUMERALS

1 AV system
20 source device
21 HDMI cable
22 AV amplifier
23a, 23b HDMI cable
24 speaker
25 analog audio cable
26 TV(2)
40 TV(1)
110 user setting information
120 device information
221 HDMI input part
222 audio/video signal processor
222a D/A converter
222b amplifier
223 first HDMI output part
224 second HDMI output part
225 memory
226 operator console
227 display
228 controller

The invention claimed is:

1. An audio device which produces audio signals suited to each of a plurality of audio output-targeted devices connected to the audio device, wherein the audio output-targeted devices include a plurality of non-speaker audio output-targeted devices, the audio device comprising:
   a first output part which is configured to output an audio signal to at least one speaker;
   a second input/output part which is configured to obtain a plurality of audio reproduction ability information from the audio output-targeted devices, wherein the plurality of audio reproduction ability information comprises a channel count of the audio device and channel counts representative of the non-speaker audio output-targeted devices;
   a memory which is configured to store the plurality of audio reproduction ability information;
   a third input/output part which is configured to provide a source device with arbitrary audio reproduction ability information precluding audio reproduction ability information that represents a minimum reproduction ability from among the plurality of audio reproduction ability information; and
   a signal processor which:
      performs down-mixing on audio signals that are read from the source device if an audio reproduction ability information of a first non-speaker audio output-targeted device is lower than the arbitrary audio reproduction ability information, wherein the second input/output part outputs the down-mixed audio signals to the first non-speaker audio output-targeted device, and
      performs signal processing on audio signals that are read from the source device, without down-mixing the audio signals, if an audio reproduction ability information of a second non-speaker audio output-targeted device is higher than the arbitrary audio reproduction ability information, wherein the second input/output part outputs the processed audio signals to the second non-speaker audio output-targeted device.

2. The audio device according to claim 1, further comprising:
   an input part that receives and stores the audio reproduction ability information of the audio output-targeted devices in the memory,
   wherein if an audio reproduction ability of the audio device is greater than an audio reproduction ability of at least one of the non-speaker audio output-targeted devices, the audio device applies channel counts precluding the minimum reproduction ability to the source device.

3. The audio device according to claim 1, wherein the signal processor performs dynamic range compression in response to a volume of audio signals subjected to down-mixing, thus controlling a volume for reproducing audio signals.

4. The audio device according to claim 1, wherein the signal processor performs down-mixing to produce audio signals after performing a convolution process using a head register transfer function in response to the prescribed channel count.

* * * * *